United States Patent
Malito

(10) Patent No.: US 7,067,106 B2
(45) Date of Patent: Jun. 27, 2006

(54) ALUMINUM HYDROXIDE, MADE VIA THE BAYER PROCESS, WITH LOW ORGANIC CARBON

(75) Inventor: John T. Malito, Oswego, IL (US)

(73) Assignee: Nalco Company, Naperville, IL (US)

( * ) Notice: Subject to any disclaimer, the term of this patent is extended or adjusted under 35 U.S.C. 154(b) by 512 days.

(21) Appl. No.: 10/610,379

(22) Filed: Jun. 30, 2003

(65) Prior Publication Data

US 2004/0265220 A1    Dec. 30, 2004

(51) Int. Cl.
*C01F 7/02* (2006.01)
*C01F 7/46* (2006.01)

(52) U.S. Cl. .................. 423/629; 423/111; 423/127; 423/130

(58) Field of Classification Search ........... 423/629, 423/111, 127, 130
See application file for complete search history.

(56) References Cited

U.S. PATENT DOCUMENTS

| | | | |
|---|---|---|---|
| 4,046,855 A | 9/1977 | Schepers et al. | |
| 4,101,629 A | 7/1978 | Mercier et al. | |
| 4,215,094 A | 7/1980 | Inao et al. | |
| 4,280,987 A | 7/1981 | Yamada et al. | |
| 4,335,082 A | 6/1982 | Matyasi et al. | |
| 4,519,989 A * | 5/1985 | Pearson et al. | 423/121 |
| 4,578,255 A * | 3/1986 | Roe et al. | 423/130 |
| 4,663,133 A | 5/1987 | Malito et al. | |
| 4,668,486 A * | 5/1987 | Brown et al. | 423/130 |
| 4,836,990 A | 6/1989 | Swinkels et al. | 423/130 |
| 6,555,077 B1 | 4/2003 | Rosenberg et al. | 423/121 |
| 2003/0161769 A1 | 8/2003 | Jenny | |

FOREIGN PATENT DOCUMENTS

| | | |
|---|---|---|
| JP | 53-146259 | 12/1978 |
| RU | 335920 | 5/1978 |
| RU | 1057423 A | 11/1983 |

OTHER PUBLICATIONS

Helble, et al., "Advanced Effluent Treatment in the Pulp and Paper Industry with a Combined Process of Ozonation and Fixed Bed Biofilm Reactors", Wat. Sci. Tech. vol. 40, No. 11-12, pp. 343-350, 1999.

"Use of Ozone for Purification of Alkali-Aluminate Solutions", Komplekskoe ispol'zovanie mineral'nogo syr'ya, No. 4, 35-40, 1981, authors: L. P. Ni, A. N. Savchenko and L.P. Lutskaya.

* cited by examiner

*Primary Examiner*—Stanley S. Silverman
*Assistant Examiner*—Timothy C. Vanoy
(74) *Attorney, Agent, or Firm*—Michael B. Martin; Thomas M. Breininger

(57) ABSTRACT

A composition of matter which is aluminum hydroxide, produced using the Bayer Process, wherein the aluminum hydroxide produced has a Total Organic Carbon of less than about 0.5 milligrams Total Organic Carbon/gram aluminum hydroxide.

9 Claims, No Drawings

ALUMINUM HYDROXIDE, MADE VIA THE BAYER PROCESS, WITH LOW ORGANIC CARBON

FIELD OF THE INVENTION

This invention relates generally to the Bayer Process and more specifically relates to a method for removing total organic carbon from aluminum hydroxide that has been produced using the Bayer process and the aluminum hydroxide produced using this method.

BACKGROUND OF THE INVENTION

Aluminum hydroxide, also known as alumina trihydrate, is the precursor of many alumina-based products, including calcined alumina used for making metallic aluminum by reduction. Aluminum hydroxide is most commonly obtained from alumina-containing ores, such as bauxite. Recovery of the alumina content of bauxite is generally accomplished by the well-known Bayer process which involves the digestion of the bauxite with a caustic medium at elevated temperatures and pressures. Digestion of the bauxite results in a saturated sodium aluminate liquor, commonly referred to as "pregnant liquor" from which the alumina content is recovered by precipitation, usually through addition of seed aluminum hydroxide.

In the Bayer process for the production of alumina, bauxite ore is pulverized, slurried in water, and then digested with caustic soda, also known as sodium hydroxide, at elevated temperatures and pressures. The caustic solution dissolves oxides of aluminum, forming an aqueous sodium aluminate solution. The caustic-insoluble constituents of bauxite ore, referred to as "red mud", are then separated from the aqueous phase containing the dissolved sodium aluminate. Solid aluminum hydroxide is precipitated out of the solution and collected as product.

In more detail, the pulverized bauxite ore is fed to a slurry mixer where a water slurry is prepared. The slurry makeup water is typically spent liquor (described below) and added caustic soda. This bauxite ore slurry is then diluted and passed through a digester or a series of digesters where, under high pressure and temperature, about 98% of the total available alumina is released from the ore as caustic-soluble sodium aluminate. After digestion, the slurry passes through several flash tanks wherein the pressure of the digested slurry is reduced from several atmospheres to one atmosphere and the temperature of the slurry is reduced from about 200° C. to about 105° C.

The aluminate liquor leaving the flashing operation contains from about 1 to about 20 weight percent solids, consisting of the insoluble residue that remains after, or is precipitated during, digestion. The coarser solid particles may be removed from the aluminate liquor with "sand trap" cyclones. The finer solid particles are generally separated from the liquor first by settling and then by filtration, if necessary. The slurry of aluminate liquor leaving the flash tanks is diluted by a stream of recycled washer overflow liquor. Any Bayer process slurry taken from the digesters through any subsequent dilution of the slurry, including the flash tanks, but before the primary settler, is referred hereinafter as the primary settler feed.

Normally, the primary settler feed is thereafter fed to the center well of the primary settler, where it is treated with a flocculant. As the mud settles, clarified sodium aluminate solution, referred to as "green" or "pregnant" liquor, overflows a weir at the top of the primary settler and is collected. This overflow from the primary settling tank is passed to the subsequent process steps.

The clarity of the primary settler overflow is crucial to the efficient processing of aluminum hydroxide. If the aluminate liquor overflowing the settler contains an unacceptable concentration of suspended solids (at times from about 10 to about 500 mg of suspended solids per liter), it must be further clarified by filtration to give a filtrate with no more than about 10 mg suspended solids per liter of liquor. The treatment of the liquor collected after the primary settlement to remove any residual suspended solids before aluminum hydroxide is recovered is referred to as a secondary clarification stage.

The clarified sodium aluminate liquor is seeded with aluminum hydroxide crystals to induce precipitation of alumina in the form of aluminum hydroxide, $Al(OH)_3$. The aluminum hydroxide particles or crystals are then separated from the concentrated caustic liquor, and the remaining liquid phase, the spent liquor, is returned to the initial digestion step and employed as a digestant after reconstitution with caustic.

Bauxite is found in many parts of the world and the composition of the ores may vary from place to place. Many bauxites contain organic carbon (also referred to as "organic impurities") that will be co-extracted with the alumina content of the ore during digestion and will contaminate the produced liquor. Most of the organic carbon content found in the ores consists of high molecular weight compounds, a portion of which will decompose to lower molecular weight compounds during the caustic digestion process, thereby producing a whole spectrum of organic salts dissolved in the liquor. Since the Bayer process involves extensive recycling of the used caustic liquor to the digestion stage, the organic carbon content of the liquor will continuously increase, reaching levels ranging from about 5 grams carbon/liter of liquor to about 40 grams carbon/liter of liquor depending on the type of bauxite being processed. The accumulation of organic carbon content can reach such high levels so as to seriously interfere with the economic and efficient production of aluminum hydroxide with an organic carbon content low enough so that the aluminum hydroxide can be used for applications requiring a low total organic carbon content.

Since the control of organic carbon levels in Bayer process liquors is an important facet in the production of aluminum hydroxide, several methods have already been developed for such organic carbon level control. It has been suggested in U.S. Pat. No. 4,046,855 (Schepers et al.) that organic impurities can be removed from Bayer process liquors by contacting the liquor with a magnesium compound which will form a precipitated mixture of magnesium and aluminum hydroxides. This precipitate, according to the patent, can remove some of the organic impurities either by adsorption or by chemisorption. The magnesium compound may be added at any stage of the Bayer process, additions prior to digestion or to the digested slurry are preferred. Although this process is capable of removing at least a portion of the organic impurities, the formation of a precipitated hydroxide mixture creates operational difficulties. On the one hand, the precipitated hydroxide mixture will contain aluminum hydroxide and this results in product alumina loss; on the other hand, the precipitated mixture has to be separated from the rest of the treated liquor and this involves additional processing steps and/or a definite increase in the quantity of the total mud load which requires disposal.

In U.S. Pat. No. 4,101,629 (Mercier et al.), a barium-containing compound is added to Bayer process liquors. The barium compound precipitates as barium aluminate and the precipitated material may also include barium salts of organic impurities present in the liquor. As in the previously discussed patent, this process involves precipitation of a compound which has to be removed from the treated liquor requiring settling and/or filtration equipment and additional processing steps. The process allows recovery and reuse of the filtered barium compound by calcination; however, the well-known toxicity of barium salts may create an unacceptable environmental and/or health risk not justifiable by the purification results obtainable by it.

In U.S. Pat. No. 4,335,082 (Matyasi et al.), organic impurities are removed from impure Bayer liquors by caustifying the liquor with lime, followed by evaporation of the causticized liquor. Evaporation will result in the precipitation of solids containing a large quantity of the organic impurities from the liquor. The solids are separated and then discarded. This method assures the removal of satisfactory quantities of organic impurities from the liquor, but the problems associated with the process render it impractical and expensive. To achieve good purification, large volumes of liquor have to be treated with lime and evaporated. These liquor treatment processes involve the use of large quantities of lime and extensive energy input and large soda value losses. "Soda value" refers to any sodium salt found in Bayer process liquor. Specifically, soda associated with sodium aluminate, free sodium hydroxide and sodium carbonate. All of these are derived from a key raw material, caustic soda, which represents a major raw material cost. Therefore, all Bayer process refineries operate to minimize the loss of soda value.

A similar purification process is disclosed in U.S. Pat. No. 4,280,987 (Yamada et al.). In this process, Bayer liquor is first evaporated, then calcined at high temperature after its alumina and caustic content is adjusted to a predetermined level. This process, known in the Bayer industry as "liquor burning," is an effective means of organic impurity removal. Its disadvantages are associated with the large volumes to be evaporated and then calcined, which require substantial capital and energy expenditures. Liquor burning also requires air emission control equipment in order to avoid air pollution issues.

In U.S. Pat. No. 4,215,094 (Inao et al.), a copper-catalyzed wet oxidation process is recommended for the oxidation of organic impurities, followed by addition of a sulfur-containing compound to remove the copper catalyst as a precipitate. The oxidation is accomplished under elevated temperature and pressure conditions in the presence of a catalyst and molecular oxygen. This process has several disadvantages in that a high temperature-pressure digestion has to be applied which involves the use of expensive pressure vessels and substantial energy usage. In addition, the copper catalyst has to be removed from the treated liquor to avoid contamination. Disposal of the removed copper sulfide can create environmental and/or health hazards. Similarly, in U.S. Pat. No. 4,663,133 (Malito et al.), organic impurities are oxidized at elevated temperature and pressure by feeding molecular oxygen directly into the bauxite digestion vessels. The amount of oxygen used is limited to below the solubility of oxygen in the liquor and is sufficient to destroy only a portion of the organic impurities. Moreover, there is the potential of explosion due to the high pressures required.

In Japanese Patent No. 53-146,259 (Kazama et al.) various oxidizing agents, such as sodium peroxide powder and 50% hydrogen peroxide, are used to destroy part of the organic impurities. Though effective, these reagents are expensive and hazardous. Also, the color of pregnant Bayer liquor is removed by passing a small stream of air containing 1% ozone through pregnant Bayer liquor. However, this dilute ozone stream only removes color and is not sufficient to oxidize any of the organic impurities.

It would be desirable to provide an aluminum hydroxide, made via the Bayer process, with lower levels of total organic carbon. It also would be desirable if the process used to provide an aluminum hydroxide, made via the Bayer process, with lower levels of total organic carbon, did not require high temperature and pressure and is, relatively speaking, environmentally benign.

SUMMARY OF THE INVENTION

The first aspect of the instant claimed invention is in a composition of matter which is aluminum hydroxide, produced using the Bayer Process, the improvement comprising producing an aluminum hydroxide wherein the Total Organic Carbon of the aluminum hydroxide is less than about 0.5 milligrams organic carbon/gram aluminum hydroxide.

The second aspect of the instant claimed invention is in the Bayer Process to produce aluminum hydroxide, the improvement comprising producing said aluminum hydroxide with a Total Organic Carbon of less than about 0.5 milligrams organic carbon/gram aluminum hydroxide, comprising the steps of:

a) dispersing the aluminum hydroxide in water, wherein the pH of the water is greater than about 10, to create a slurry of aluminum hydroxide in water, wherein said slurry comprises from about 50 to about 1000 grams of solids per liter of water, wherein the temperature of said slurry is from about 5° C. to about 95° C.;

b) maintaining the solids in suspension in the slurry using any appropriate agitation technique;

c) contacting said slurry with a mixture of ozone in oxygen wherein the concentration of ozone in oxygen is from about 1 weight percent to about 20 weight percent and the temperature of the ozone in oxygen mixture is from about 0° C. to about 30° C.; and d) collecting the aluminum hydroxide from the slurry.

DETAILED DESCRIPTION OF THE INVENTION

The first aspect of the instant claimed invention is in a composition of matter which is aluminum hydroxide, produced using the Bayer Process, the improvement comprising producing an aluminum hydroxide wherein the Total Organic Carbon of the aluminum hydroxide is less than about 0.5 milligrams organic carbon/gram aluminum hydroxide.

Aluminum hydroxide, produced according to the Bayer process, is dispersed in water to produce a slurry containing from about 50 grams solids/liter of water to about 1000 grams solids/liter of water, preferably from about 400 grams solids/liter of water to about 700 grams solids/liter of water.

The temperature of the slurry should be from about 5° C. to about 95° C., preferably from about 15° C. to about 40° C. and most preferably from about 20° C. to about 30° C.

The solids should be maintained in suspension using any appropriate agitation technique. This includes, but is not limited to, such methods as mechanical agitation in a batch or continuous tank vessel or a fluidized bed reactor or any other suitable reactor or by turbulent flow in a continuous pipe-flow reactor.

The pH of the slurry should be basic, greater than about 9, more preferably greater than about 10 and most preferably greater than about 12. Any suitable base can be used to raise and maintain the pH of the slurry at the requisite level. Suitable bases include lithium hydroxide, sodium hydroxide, potassium hydroxide, cesium hydroxide, magnesium oxide, calcium oxide, strontium oxide, barium oxide, or their respective hydroxides. The preferred bases are sodium hydroxide, calcium oxide and barium oxide. The most preferred bases are calcium oxide and barium oxide.

The calcium oxide and barium oxide bases are preferred because they react with and precipitate the carbonate ion that is ultimately formed during the reaction of ozone with carbon compounds, according to this generalized sequence of reactions:

$$O_3 + C \rightarrow CO_2 + \tfrac{1}{2} O_2$$

$$CO_2 + 2OH^- \rightarrow CO_3^{2-} + H_2O$$

$$M(OH)_2 + CO_3^{2-} \rightarrow MCO_3 + 2OH^- \text{ (where M=calcium or barium)}$$

Without the removal of the carbonate ion from the water phase, the efficiency of ozone interaction with aluminum hydroxide is reduced due to the quenching of the hydroxyl radical. This is because the hydroxyl radical is formed from ozone and it is the hydroxyl radical which is the reactive species responsible for the oxidation of the organic compounds in alkaline pH.

A mixture of ozone in oxygen, containing from about 1 wt. % ozone to about 20 wt. % ozone, is added to the aluminum hydroxide slurry at a temperature of from about 0° C. to about 30° C., preferably from about 10° C. to about 20° C. The ozone/oxygen mixture can be added to the aluminum hydroxide slurry by any conventional method in an amount which effectively removes organic carbon from the aluminum hydroxide. Typical equipment which may be used for adding the ozone/oxygen mixture to the aluminum hydroxide slurry includes, but is not limited to, batch or continuous tank reactors, packed bed reactors, moving bed reactors, gas diffusers in a mixed tank and any other device designed for contacting a gas with a liquid or a slurry. This type of equipment is described in Helble, et al., "Advanced Effluent Treatment in the Pulp and Paper Industry with a Combined Process of Ozonation and Fixed Bed Biofilm Reactors," Wat. Sci. Tech. Vol. 40, No. 11–12, pp. 343–350, 1999.

After the vessel to hold the aluminum hydroxide slurry has been selected, the preferred method of contact is to inject the mixture of ozone in oxygen into the slurry using commercially available ozone in oxygen low-pressure injection equipment.

The amount of ozone/oxygen mixture which is added to the aluminum hydroxide slurry is dependent upon the particular type of equipment used. The amount of the ozone/oxygen mixture is typically in the range of from about 0.4 grams of ozone to about 10 grams of ozone per kilogram of aluminum hydroxide solids. Though it is to be understood by those skilled in the art that the maximum amount of the ozone/oxygen mixture which can be added is practically limited only by the amount of ozone that can be physically absorbed by the slurry.

The ozone remains in contact with the slurry for a time period of from about 10 minutes to about 150 minutes, preferably from about 30 minutes to about 120 minutes and most preferably from about 60 minutes to about 90 minutes. The amount of time the ozone remains in contact with the slurry is dependent upon many factors including the rate of ozone addition into the slurry and the levels of solids in the slurry. The relatively faster the ozone is added to the slurry, the relatively less the amount of time it takes to complete the process. Optimization of the rate of addition of ozone to the slurry and amount of time it takes to adequately remove organic carbon from the aluminum hydroxide is within the ability of a person of ordinary skill in the art to determine.

At the conclusion of the process the ozone feed is turned off and the solid aluminum hydroxide is collected from the slurry using any of the typical solids collection techniques known in the art, including, but not limited to, evaporation, filtration, centrifugation, sedimentation and decantation.

For those intended uses requiring very pure aluminum hydroxide, the aluminum hydroxide collected from the ozone-treated slurry may be further purified by digesting it in sodium hydroxide solution followed by precipitation using pure aluminum hydroxide seed. The process has the following additional steps:

e) adding the aluminum hydroxide to a solution of sodium hydroxide in water and allowing the sodium hydroxide to digest the aluminum hydroxide;

f) adding solid aluminum hydroxide to the solution to begin seeded precipitation of aluminum hydoxide;

g) collecting the precipitated aluminum hydroxide, which has a Total Organic Carbon of less than about 0.2 milligrams organic carbon/gram of aluminum hydroxide.

Aluminum hydroxide, produced using the Bayer Process and treated with ozone and then digested and reprecipitated from sodium hydroxide can have a total organic content of less than about 0.2 milligrams organic carbon/gram of aluminum hydroxide.

The products produced by the described processes are aluminum hydroxides, produced via the Bayer process, with subsequent processing, wherein the aluminum hydroxides produced have a Total Organic Carbon of less than about 0.5 milligrams organic carbon per gram of aluminum hydroxide.

EXAMPLES

The following examples are intended to be illustrative of the present invention and to teach one of ordinary skill how to make and use the invention. These examples are not intended to limit the invention or its protection in any way.

Example 1

Aluminum hydroxide, produced according to the Bayer process, was dispersed in water to produce a slurry containing about 442 grams solids/liter of water. The pH was adjusted to a pH of at least about 12 by the addition of 33% NaOH, at a rate of about 1 milliliter of 33% NaOH per liter of water in the slurry. The solids were maintained in suspension by mechanical agitation in a batch tank.

A mixture of ozone in oxygen, containing about 14 wt. % ozone, was injected into the aluminum hydroxide slurry at a temperature of about 23° C. The ozone was left in contact with the slurry for about 90 minutes.

The color of the aluminum hydroxide was measured with a Hunter LabScan XE spectrophotometer, as a function of absorbed ozone. The data are shown in the table. The Total Organic Carbon was measured by combusting the sample and determining the amount of carbon dioxide by infrared analysis.

Total Organic Carbon ("TOC") can be reported in milligrams organic carbon per gram of aluminum hydroxide or it can be reported in wt. % TOC which is:

$$\frac{\text{grams organic carbon}}{\text{gram of aluminum hydroxide}} \times 100$$

Table 1 gives the results.

Example 1

TABLE 1

| Absorbed Ozone (g ozone/kg aluminum hydroxide) | Hunter Color a* (green-red) | Hunter Color b* (blue-yellow) | Total Organic Carbon in milligrams carbon per gram of aluminum hydroxide | Wt. % TOC |
|---|---|---|---|---|
| 0.00 | 0.88 | 4.05 | 0.58 | 0.0576 |
| 0.48 | 0.57 | 3.30 | 0.54 | 0.0538 |
| 0.97 | 0.49 | 2.83 | 0.47 | 0.0474 |
| 1.47 | 0.49 | 2.81 | 0.40 | 0.0403 |
| 1.99 | 0.43 | 2.77 | 0.36 | 0.0360 |
| 2.49 | 0.49 | 2.84 | 0.32 | 0.0320 |
| 2.96 | 0.47 | 2.71 | 0.29 | 0.0291 |
| 3.41 | 0.47 | 2.79 | 0.27 | 0.0270 |
| 3.83 | 0.44 | 2.65 | 0.24 | 0.0241 |
| 4.20 | 0.39 | 2.37 | 0.21 | 0.0205 |

The Hunter Color data indicates that the lowering of total organic carbon is accompanied by a reduction in color.

Example 2

Aluminum hydroxide, produced according to the Bayer process, was dispersed in water to produce a slurry containing about 332 g solids/liter of water. The pH was adjusted to pH 12 by the addition of 33% NaOH, at a rate of about 1 milliliter per liter of water in the slurry. The water temperature was about 22° C. The solids were maintained in suspension by mechanical agitation in a batch tank reactor. A mixture of room temperature ozone in oxygen, containing about 13 wt. % ozone, was injected into the aluminum hydroxide slurry. The ozone was left in contact with the slurry for about 90 minutes. Table 2 gives the results Example 2

TABLE 2

| Absorbed Ozone (g ozone/kg aluminum hydroxide) | Total Organic Carbon in milligrams carbon per gram of aluminum hydroxide | Wt. % TOC |
|---|---|---|
| 0 | 0.57 | 0.057 |
| 0.73 | 0.42 | 0.042 |
| 1.50 | 0.30 | 0.030 |
| 2.33 | 0.27 | 0.027 |
| 3.16 | 0.22 | 0.022 |
| 4.01 | 0.25 | 0.025 |
| 4.83 | 0.24 | 0.024 |
| 5.67 | 0.26 | 0.026 |
| 6.49 | 0.23 | 0.023 |
| 7.31 | 0.21 | 0.021 |

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. In a composition of matter which is aluminum hydroxide, produced using the Bayer Process, the improvement comprising producing an aluminum hydroxide wherein the Total Organic Carbon of the aluminum hydroxide is less than about 0.5 milligrams Total Organic Carbon/gram of aluminum hydroxide.

2. The composition of matter of claim 1 wherein the Total Organic Carbon of the aluminum hydroxide is less than about 0.3 milligrams Total Organic Carbon/gram of aluminum hydroxide.

3. The composition of matter of claim 1 wherein the Total Organic Carbon of the aluminum hydroxide is less than about 0.2 milligrams Total Organic Carbon/gram of aluminum hydroxide.

4. In the Bayer Process to produce aluminum hydroxide, the improvement comprising producing said aluminum hydroxide with a Total Organic Carbon of less than about 0.5 milligrams Total Organic Carbon/gram aluminum hydroxide; comprising the steps of:
   a) dispersing the aluminum hydroxide in water, wherein the pH of the water is greater than about 10, to create a slurry of aluminum hydroxide in water, wherein said slurry comprises from about 50 to about 1000 grams of solids per liter of water, wherein the temperature of said slurry is from about 5° C. to about 95° C.;
   b) maintaining the solids in suspension in the slurry using any appropriate agitation technique;
   c) contacting said slurry with a mixture of ozone in oxygen wherein the concentration of ozone in oxygen is from about 1 weight percent to about 20 weight percent and the temperature of the ozone in oxygen mixture is from about 0° C. to about 30° C.; and
   d) collecting the aluminum hydroxide from the slurry.

5. The process of claim 4 wherein the pH of the slurry is maintained above 10 by addition of a base to said slurry, wherein said base is selected from the group consisting of lithium hydroxide, sodium hydroxide, potassium hydroxide, cesium hydroxide, magnesium oxide, calcium oxide, strontium oxide, barium oxide, and their respective hydroxides.

6. The process of claim 5 in which said base is selected from the group consisting of calcium oxide, barium oxide and their respective hydroxides; and sodium hydroxide.

7. The process of claim 6 in which said base is calcium oxide.

8. The process of claim 6 in which said base is barium oxide.

9. The process of claim 4, further comprising the steps of:
   e) adding the collected aluminum hydroxide to a solution of sodium hydroxide in water and allowing the sodium hydroxide to digest the aluminum hydroxide;
   f) adding solid aluminum hydroxide to said solution to begin seeded precipitation of aluminum hydroxide; and
   g) collecting the precipitated aluminum hydroxide, wherein said precipitated aluminum hydroxide has a Total Organic Carbon of less than about 0.2 mg organic carbon/gram of aluminum hydroxide.

* * * * *